US008197109B2

(12) United States Patent
Iwasaki

(10) Patent No.: US 8,197,109 B2
(45) Date of Patent: Jun. 12, 2012

(54) LAMP FOR VEHICLE

(75) Inventor: Kazunori Iwasaki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 360 days.

(21) Appl. No.: 12/465,296

(22) Filed: May 13, 2009

(65) Prior Publication Data

US 2009/0284980 A1 Nov. 19, 2009

(30) Foreign Application Priority Data

May 14, 2008 (JP) ................................. 2008-127098

(51) Int. Cl.
*F21V 7/09* (2006.01)
*B60Q 1/04* (2006.01)

(52) U.S. Cl. ......... 362/517; 362/298; 362/346; 362/545

(58) Field of Classification Search .................. 362/517, 362/518, 545, 298, 346, 296.06, 296.08
See application file for complete search history.

(56) References Cited

U.S. PATENT DOCUMENTS 5,055,981 A * 10/1991 Nino ............................ 362/539
7,186,009 B2 * 3/2007 Yamamura et al. ........... 362/517
7,207,705 B2 * 4/2007 Ishida .......................... 362/517
7,334,926 B2 * 2/2008 Takada ......................... 362/517
7,866,863 B2 * 1/2011 Tanaka ......................... 362/518

FOREIGN PATENT DOCUMENTS

JP 2005-302603 A 10/2005
JP 2006-019052 A 1/2006
JP 2008-041557 A 2/2008

* cited by examiner

*Primary Examiner* — Peggy A. Neils
(74) *Attorney, Agent, or Firm* — Foley & Lardner LLP

(57) ABSTRACT

The present invention relates to a lamp for vehicle which can obtains an ideal light distribution pattern using one light unit. The lamp for vehicle according to the present invention comprises: a first reflecting surface (11) in ellipse shape; a semiconductor light source (3) at a first focus (F11) or its vicinity of the first reflecting surface; and reflecting surfaces (12, 13, 14) in parabola shape controlling the reflected light (L2) from the first reflecting surface (11) to be reflected on the road as predetermined light distribution patterns (LP, HP, SP, WP). The second reflecting surface (12) forms light distribution pattern for high light degree (HP). The third reflecting surface 13 forms light distribution pattern for collection (SP) having the light distribution pattern for high light degree (HP). The fourth reflecting surface 14 forms light distribution pattern for diffusion (WP) overlapping the light distribution pattern for high light degree (HP) and the light distribution pattern for collection (SP). As a result, ideal light distribution patterns can be obtained using one light unit, and thus the traffic safety is greatly improved.

2 Claims, 7 Drawing Sheets

LAMP FOR VEHICLE

FIELD

The present invention relates to a lamp for vehicle that uses a semiconductor light source as a light source and has a plurality of reflecting surfaces.

BACKGROUND

There has existed this type of lamp for vehicle (for example, Japanese Patent Application Publication No. 2008-41557). The following is an explanation of the existing lamp for vehicle. The existing lamp for vehicle comprises a semiconductor light source, a first reflecting surface, a second reflecting surface, a third reflecting surface, and a fourth reflecting surface. The following is an explanation of the function of the existing lamp for vehicle. The semiconductor light source is turned on to emit light. Part of the light from the semiconductor light source is reflected by the first reflecting surface. Part of the reflected light is reflected by the third reflecting surface to illuminate on the road as a light distribution pattern having a horizontal cutoff line at an upper edge thereof. In addition, the remaining reflected light from the first reflecting surface illuminate on the road as a light distribution pattern having hot spot reflected mainly by the second reflecting surface and overlapping in the above light distribution pattern and having a protrusion of a oblique cutoff line extending above the horizontal cutoff line. In addition, the remaining light from the semiconductor light source is reflected mainly by the fourth reflecting surface to emit on an aerial mark (overhead mark) as a light distribution pattern for the aerial mark. Therefore, the existing lamp for vehicle provides an ideal light distribution pattern using one light unit.

SUMMARY OF THE INVENTION

The problem that the present invention aims to solve is to improve the above existing lamp for vehicle.

The lamp for vehicle according to the present invention (relating to the invention presented by solution 1) is characterized in that the lamp for vehicle comprises: a first reflecting surface in ellipse shape, a semiconductor light source at a first focus or its vicinity of the first reflecting surface, a second reflecting surface in parabola shape controlling the reflected light from the first reflecting surface to be reflected on the road as a light distribution pattern for high light degree having a high light portion, a third reflecting surface in parabola shape controlling the reflected light from the first reflecting surface to be reflected on the road as a light distribution pattern for collection having a light distribution pattern for high light degree, a fourth reflecting surface in parabola shape controlling the reflected light from the first reflecting surface to be reflected on the road as a light distribution pattern for diffusion overlapping the light distribution pattern for high light degree and the light distribution pattern for collection.

Further, the lamp for vehicle according to the present invention (relating to the invention presented by solution 2) is characterized in that: the second reflecting surface is at an opposing vehicle line side (the vehicle line side of the vehicle driving opposingly) relative to the third reflecting surface, and the second reflecting surface and the third reflecting surface are above relative to the fourth reflecting surface.

Further, the lamp for vehicle according to the present invention (relating to the invention presented by solution 3) is characterized in that: a second focus or its vicinity of the first reflecting surface is provided with a light-blocking shield blocking part of the reflected light from the first reflecting surface; the light-blocking shield is provided with a light-blocking shield reflecting surface reflecting part of the reflected light from the first reflecting surface blocked by the light-blocking shield to the second reflecting surface and the third reflecting surface; the second reflecting surface and the third reflecting surface and the fourth reflecting surface are reflecting surfaces whose focus is at the second focus and its vicinity of the first reflecting surface and whose purpose is to control the reflected light from the first reflecting surface and the reflected light from the light-blocking shield reflecting surface to be reflected on the road as a light distribution pattern for interleaving.

Further, the lamp for vehicle according to the present invention (relating to the invention presented by solution 4) is characterized in that above the second reflecting surface and the third reflecting surface and the fourth reflecting surface is provided with a parabola reflecting surface for aerial mark whose focus is at the semiconductor light source or its vicinity and whose purpose is to control the light from the semiconductor light source to be reflected as a light distribution pattern for aerial mark.

The following is an explanation of the effect of the present invention.

The lamp for vehicle according to the present invention (relating to the invention presented by solution 1) obtains a light distribution pattern for high light degree having a high light portion through a second reflecting surface, obtains a light distribution pattern for collection having a light distribution pattern for high light degree through a third reflecting surface, and obtains a light distribution pattern for diffusion overlapping the light distribution pattern for high light degree and the light distribution pattern for collection through a fourth reflecting surface. As a result, the lamp for vehicle according to the present invention (relating to the invention presented by solution 1) obtains an ideal light distribution pattern using one light unit to guarantee the traffic safety.

Further, in the lamp for vehicle according to the present invention (relating to the invention presented by solution 2), because the second reflecting surface is at an opposing vehicle line side relative to the third reflecting surface, the light distribution pattern for high light degree contained in the light distribution pattern for collection can be obtained at a vehicle driving line side (the vehicle line side of the vehicle) by light distribution through simple light distribution design (for example, the light distribution design in which the light axis of the second reflecting surface turns to the vehicle driving line side). In addition, in the lamp for vehicle according to the present invention (relating to the invention presented by solution 2), because the light distribution pattern for high light degree contained in the light distribution pattern for collection is at the vehicle driving line side, the eye vision is greatly improved, and thus the traffic safety is greatly improved. Further, in the lamp for vehicle according to the present invention (relating to the invention presented by solution 2), because the second reflecting surface and the third reflecting surface are above relative to the fourth reflecting surface, and the light distribution pattern for high light degree and the light distribution pattern for collection position are above the light distribution pattern for diffusion, an ideal light distribution pattern for interleaving can be obtained using one light unit, and thus the traffic safety is greatly improved.

Further, in the lamp for vehicle according to the present invention (relating to the invention presented by solution 3), through the mechanism solving the above problems, part of the reflected light from the first reflecting surface is blocked by a light-blocking shield, and thus the second reflecting surface and the third reflecting surface and the fourth reflecting surface can easily control a light distribution pattern for interleaving having a cutoff line. In addition, in the lamp for vehicle according to the present invention (relating to the invention presented by solution 3), because the light-blocking shield reflecting surface reflects part of the reflected light from the first reflecting surface blocked by the light-blocking shield to the second reflecting surface and the third reflecting surface, the light from the semiconductor light source is effectively used. Therefore, the lamp for vehicle according to the present invention (relating to the invention presented by solution 3) can obtain an ideal light distribution pattern for interleaving by using one light unit, and thus the traffic safety is greatly improved.

Further, in the lamp for vehicle according to the present invention (relating to the invention presented by solution 4), through the mechanism solving the above problems, because the parabola reflecting surface for aerial mark is above the second reflecting surface and the third reflecting surface and the fourth reflecting surface, as a light distribution pattern for aerial mark, the parabola reflecting surface for aerial mark controls the light from the semiconductor light source. Therefore, the lamp for vehicle according to the present invention (relating to the invention presented by solution 4) can obtain an ideal light distribution pattern for interleaving and an ideal light distribution pattern for aerial mark using one light unit, and thus the traffic safety is greatly improved.

DRAWINGS

Figure 9:
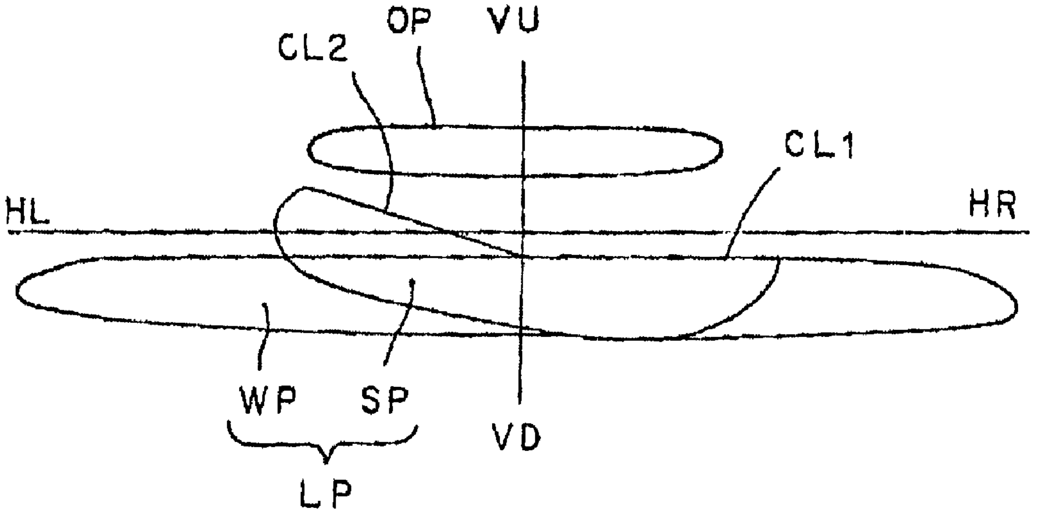

FIG. 9 is a view explaining the light distribution pattern for high light degree and the light distribution pattern for collection of the light distribution pattern for interleaving obtained by the second reflecting surface and the third reflecting surface, the light distribution pattern for diffusion of the light distribution pattern for interleaving obtained by the fourth reflecting surface, and the light distribution pattern for aerial mark obtained by the fifth reflecting surface.

Figure 1:
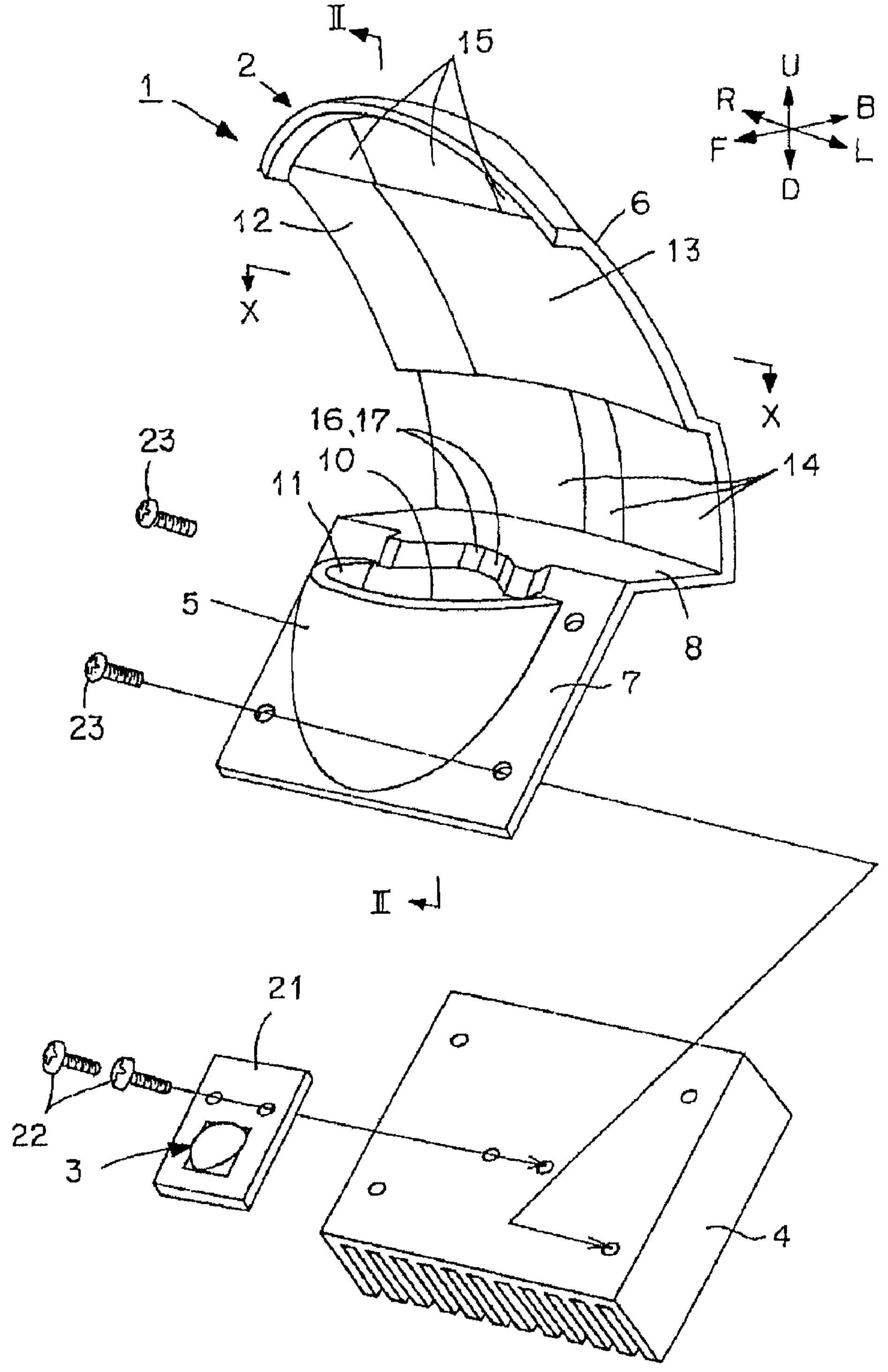
FIG. 1 is an exploded view showing the reflector, the semiconductor light source, and the radiator in the embodiment of the lamp for vehicle according to the present invention.
Figure 10:
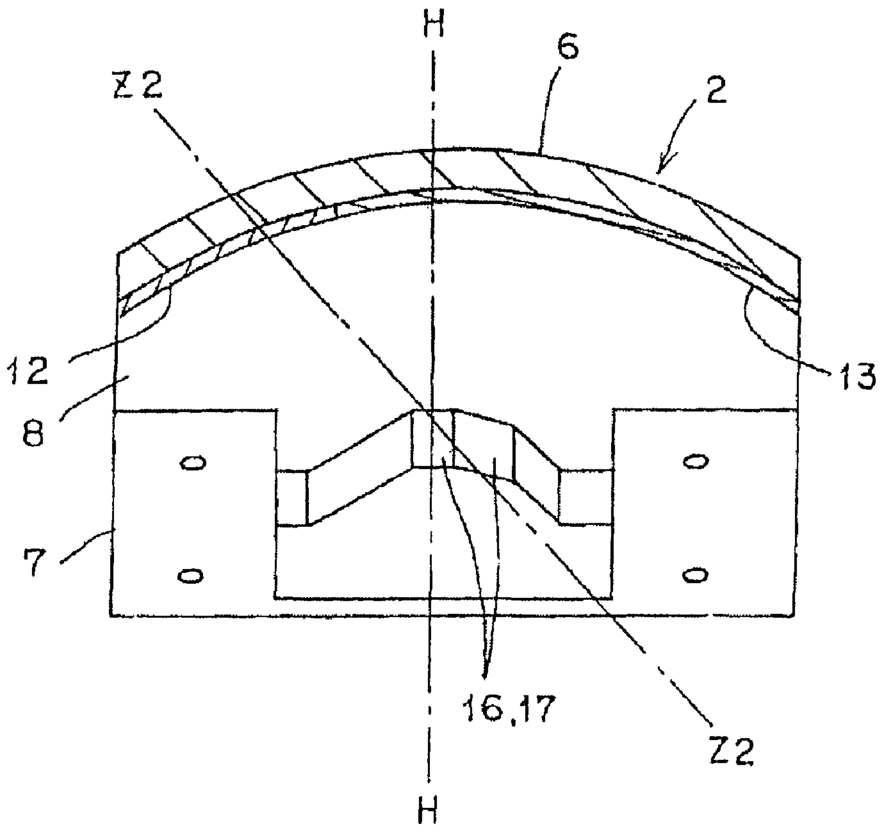

FIG. 10 is an exploded view long line X-X in FIG. 1.

Wherein:

1—light unit (lamp for vehicle), 2—reflector, 3—semiconductor light source, 4—radiator member, 5—ellipse portion, 6—parabola portion, 7—oblique portion, 8—horizontal portion, 9—first opening, 10—second opening, 11—first reflecting surface (ellipse reflecting surface), 12—second reflecting surface (parabola reflecting surface), 13—third reflecting surface (parabola reflecting surface), 14—fourth reflecting surface (parabola reflecting surface), 15—fifth reflecting surface (parabola reflecting surface for aerial mark), 16—light-blocking shield, 17—light-blocking shield reflecting surface, 18—base, 19—light source sheet, 20—light-through member, 21—rack, 22, 23—bolt, F—front, B—rear, U—up, D—down, L—left, R—right, HL-HR—horizontal line of the screen, VU-VD—vertical line of the screen, H-H—horizontal axis (advance axis of the vehicle), Z1-Z1—light axis of the first reflecting surface, F11—first focus of the first reflecting surface, F12—second focus of the first reflecting surface, Z2-Z2—light axis of the second reflecting surface, F2—focus of the second reflecting surface, Z3-Z3—light axis of the third reflecting surface, F3—focus of the third reflecting surface, Z4-Z4—light axis of the fourth reflecting surface, F4—focus of the fourth reflecting surface, Z5-Z5—light axis of the fifth reflecting surface, F5—focus of the fourth reflecting surface, LP—light distribution pattern for interleaving, CL1—horizontal cutoff line, CL2—oblique cutoff line, HP—light distribution pattern for high light degree, SP—light distribution pattern for collection, WP—light distribution pattern for diffusion, OP—light distribution pattern for aerial mark, L1—most part of light from semiconductor light source, L2—reflected light from the first reflecting surface not blocked by the light-blocking shield, L3—reflected light from the first reflecting surface blocked by the light-blocking shield, L4—reflected light from light-blocking shield reflecting surface, L5—straight light from semiconductor light source.

DETAILED DESCRIPTION

The following is an explanation of the lamp for vehicle of embodiments according to the present invention. It is understood that the embodiments do not limit the present invention. In figures, "F" denotes the front side of the vehicle (the advance side of the vehicle). "B" denotes the rear side of the vehicle. "U" denotes the upper side above the front side viewed from the driver side. "D" denotes the down side below the front side viewed from the driver side. "L" denotes the left side when the driver looks at the front side. "R" denotes the right side when the driver looks at the front side. "H-H" denotes horizontal axis (the axis parallel to the advance axis of the vehicle). The front side, rear side, upper side, down side, left side, and right side mentioned above are the front side, rear side, upper side, down side, left side, and right side when the lamp for vehicle according to the present invention is mounted on the vehicle. In addition, "VU-VD" denotes the vertical line (up-down line) of the screen. "HL-HR" denotes the horizontal line (left-right line) of the screen.

Embodiments

The following is an explanation of the structure of the lamp for vehicle according to present invention. The lamp for vehicle in the embodiments is mounted on the left side and the right side of the front side of the vehicle (for example a car) and is, for example, an interleaving (low ray) headlamp of 4 reflector type (reflecting type) lamps. The above headlamp is used for the left side driving in Japan. The headlamp used for the left side driving in Europe has substantially the same structure as the above headlamp in Japan. In addition, the headlamp used for the right side driving in Europe and North America has substantially the same structure as the above headlamp in Japan, and has arrangement of left-right exchange.

The lamp for vehicle in the embodiment comprises: a light unit 1, a light housing (not shown), and a light lens (not shown, for example a transparent outer lens). The light unit 1 is mounted in a light chamber (not shown) defined by the light housing and the light lens. In addition, the light unit 1 is mounted on the light housing by a rack or a bracket (not shown) and a light axis adjusting device (not shown).

Figure 2:
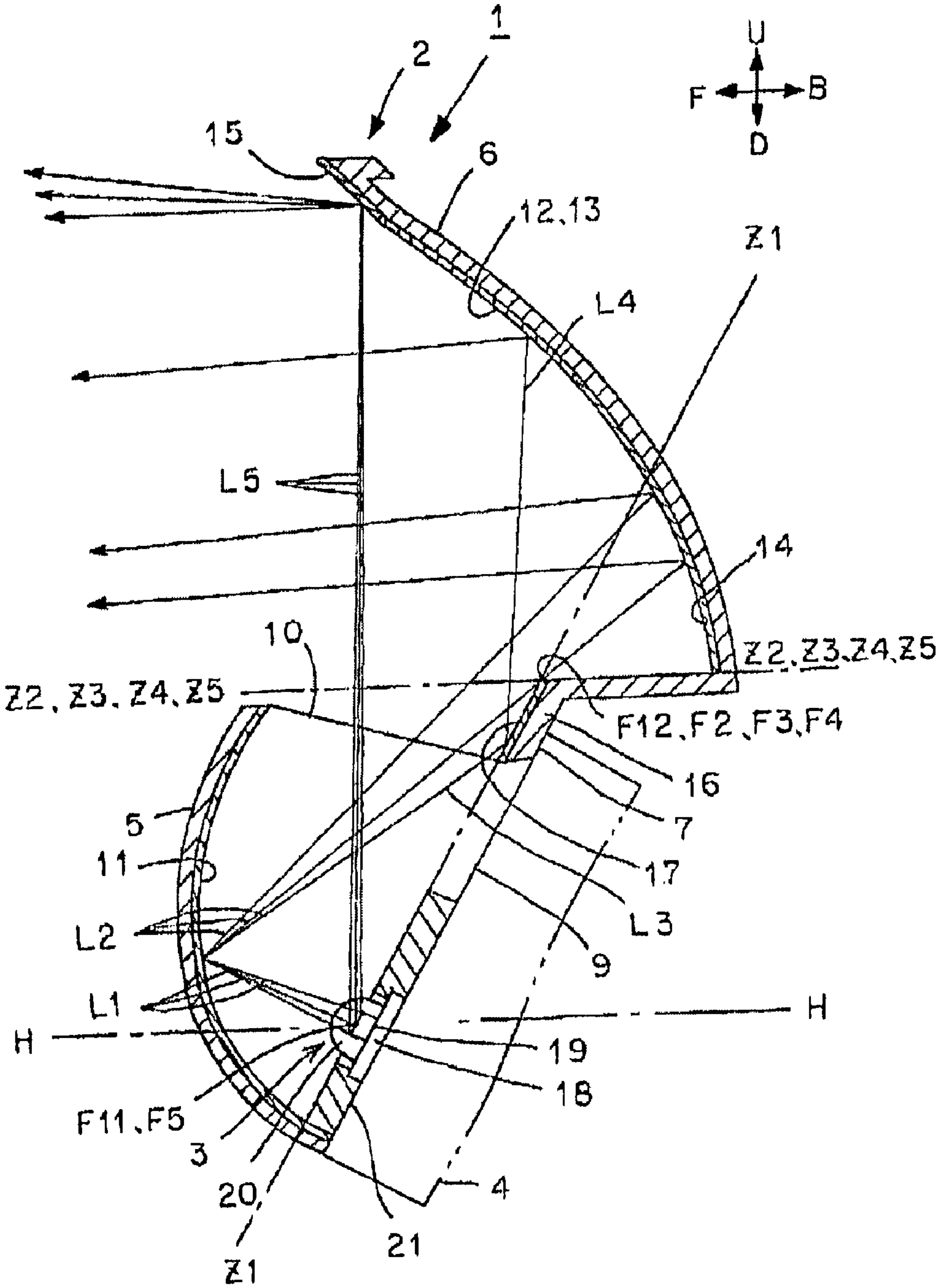
FIG. 2 is a longitudinal sectional view (vertical view) corresponding to the sectional view along line II-II in FIG. 1.
Figure 3:
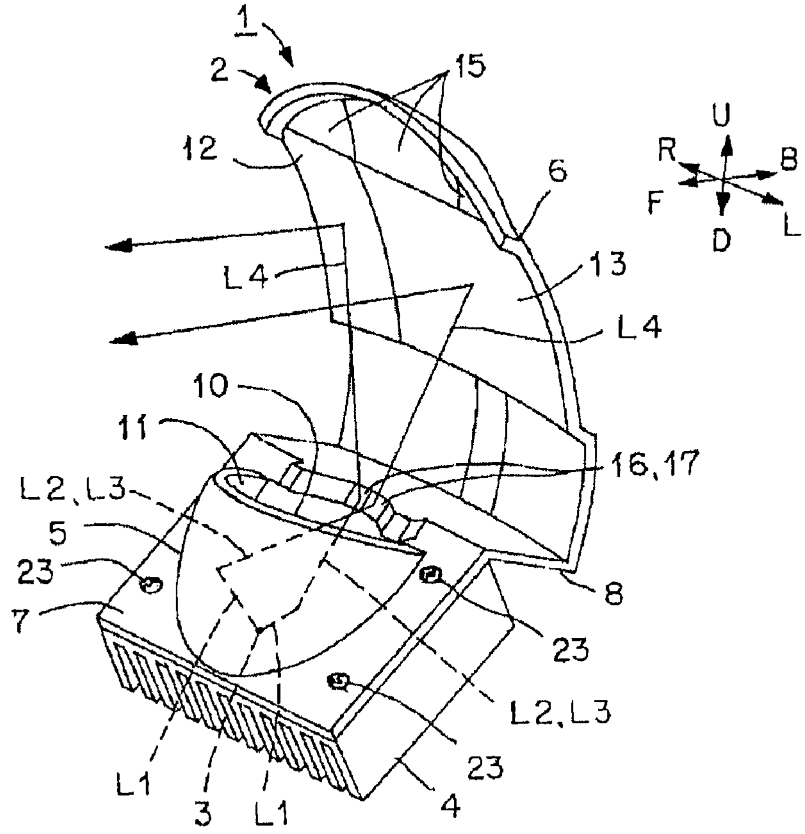
FIG. 3 is a view explaining the reflecting function of the second reflecting surface and the third reflecting surface.

As shown in FIG. 1, the light unit comprises a reflector 2, a semiconductor light source 3 and a radiator member 4. The reflector 2 is made of, for example, lightproof resin. As shown in FIG. 1 and FIG. 2, the reflector 2 is integrated as one piece by an ellipse portion 5, a parabola portion 6, oblique portion 7, and a horizontal portion 8.

The ellipse portion 5 is made with a shape in which a member in a rotating ellipse shape is divided into four portions in the long axis direction and in the short axis direction, and has a first opening 9 in the long axis direction and a second opening 10 in the short axis direction. The edge of the first opening 9 of the ellipse portion 5 is provided integrally with the oblique portion 7. An edge (the upper edge) of the oblique portion 7 is provided integrally with an edge (the front edge) of the horizontal portion 8. Another edge (the rear edge) of the horizontal portion 8 is provided integrally with an edge (the down edge) of the parabola portion 6. The ellipse portion 5 is at the down side obliquely of the front side relative to the parabola portion 6. The parabola portion 6 is opposite to the second opening 10 of the ellipse portion 5. Relative to the horizontal portion 8, an edge of the oblique portion 7 tilts toward the side (rear side) opposite to the light emitting direction of the light unit 1 and another side (down side) of the oblique portion 7 tilts toward the side (front side) of the light emitting direction of the light unit 1. The horizontal portion 8 is parallel (including substantially parallel) to the horizontal axis H-H.

The reflector 2 is provided integrally with optical members such as a first reflecting surface 11, a second reflecting surface 12, a third reflecting surface 13, a fourth reflecting surface 14, a fifth reflecting surface 15, a light-blocking shield 16, and a light-blocking shield reflecting surface 17, etc. Aluminum evaporation or silver coating is applied to the inner surface opposite to the first opening 9 and the second opening 10 of the ellipse portion 5, and the said inner surface is formed integrally with the first reflecting surface 11. Aluminum evaporation or silver coating is applied to the inner surface of the parabola portion 6 opposite to the second opening 10 and the first reflecting surface 11, and the inner surface of the parabola portion 6 is formed integrally with the second reflecting surface 12, the third reflecting surface 13, the fourth reflecting surface 14, and the fifth reflecting surface 15. An edge (upper edge) 7 of the oblique portion 7 is formed integrally with the light-blocking shield 16. Aluminum evaporation or silver coating is applied to the surface of the light-blocking shield 16 opposite to the second opening 10, the first reflecting surface 11, the second reflecting surface 12, the third reflecting surface 13, and the fourth reflecting surface 14, and the said surface of the light-blocking shield 16 is formed integrally with the light-blocking shield reflecting surface 17.

The semiconductor light source 3 uses self-luminous semiconductor light source (LED in the embodiment) such as LED, EL (organic EL), etc. As shown in FIG. 2, the semiconductor light source 3 comprises a base 18, a light source sheet 19 mounted on one side of the base 18, and a light-through member (lens) 20 in semi-sphere (semi-circle) shape covering the light source sheet 19. The light source sheet 19 in the embodiment is made to be in the shape of rectangle.

The semiconductor light source 3 is fixed to the radiator member 4 by rack 21 and bolt 22. In addition, the oblique portion 7 of the reflector 2 is fixed to the radiator member 4 by bolt 23. As a result, the light unit 1 is formed. At this moment, the first opening 9 of the ellipse portion 5 of the reflector 2 is blocked out by the radiator member 4. In addition, the first reflecting surface 11 of the ellipse portion 5 of the reflector 2 is opposite to the semiconductor light source 3. Further, the light source sheet 19 in the shape of rectangle of the semiconductor light source 3 is orthogonal (including substantially orthogonal) to the horizontal axis (advance axis of the vehicle) H-H. In other words, the semiconductor light source 3 is made to have the same structure as a transverse lamp (a bulb whose cylindrical filament is orthogonal relative to the horizontal axis (advance axis of the vehicle) H-H). Further, FIG. 1 shows two bolts 23 fixing the reflector 2 to the radiator member 4; the other two bolts are not shown.

The first reflecting surface 11 is an ellipse-reflecting surface. The ellipse reflecting surface is formed by a free curved surface having ellipse benchmark or formed by a rotating ellipse surface. The reflecting surface formed by a free curved surface having ellipse benchmark is that the vertical sectional surface in FIG. 2 is made to be an ellipse, and the horizontal surface (not shown) is a reflecting surface formed by parabola or deformed parabola or deformed ellipse or their combination. As a result, as an ellipse reflecting surface, the first reflecting surface 11 has a light axis Z1-Z1, a first focus F11, and a second focus (focus line) F12. As shown in FIG. 2, the light axis Z1-Z1 of the first reflecting surface 11 tilts relative to horizontal axis H-H viewed from side surface. The first focus F11 is at the down side obliquely of the front side relative to the second focus F12. The light source sheet 19 of the semiconductor light source 3 is at the first focus F11 or its vicinity of the first reflecting surface 11. As a result, the most part L1 of the light from the light source sheet 19 of the semiconductor light source 3 is reflected by the first reflecting surface 11 and converges at the second focus F12 or its vicinity of the first reflecting surface 11.

The second reflecting surface 12, the third reflecting surface 13, the fourth reflecting surface 14, and the fifth reflecting surface 15 are parabola reflecting surfaces. The parabola reflecting surface is formed by a free curved surface having parabola benchmark or formed by a rotating parabola surface. The reflecting surface formed by a free curved surface having parabola benchmark is that the vertical sectional surface in FIG. 2 is made to be a parabola, and the horizontal surface (not shown) is a reflecting surface formed by ellipse or deformed ellipse or deformed parabola or their combination. As a result, as parabola reflecting surfaces, the second reflecting surface 12, the third reflecting surface 13, the fourth reflecting surface 14, and the fifth reflecting surface 15 have light axes Z2-Z2, Z3-Z3, Z4-Z4, Z5-Z5 and focuses (focus line) F2, F3, F4, F5. As shown in FIG. 2, the light axes Z2-Z2, Z3-Z3, Z4-Z4, Z5-Z5 of the second reflecting surface 12, the third reflecting surface 13, the fourth reflecting surface 14, and the fifth reflecting surface 15 are parallel (including substantially parallel) to the horizontal H-H viewed from side surface. The focuses F2, F3, F4 of the second reflecting surface 12, the third reflecting surface 13, and the fourth reflecting surface 14 are at the second focus F12 or its vicinity of the first reflecting surface 11. The focus F5 of the fifth reflecting surface 15 is at the first focus F11 or its vicinity of the first reflecting surface.

Relative to the second reflecting surface 12, the third reflecting surface 13, the fourth reflecting surface 14, and the fifth reflecting surface 15, the first reflecting surface 11 is at the down side obliquely of the front side. Between the side of the first reflecting surface 11 & the semiconductor light source 3 and the side of the second reflecting surface 12, the third reflecting surface 13, the fourth reflecting surface 14, and the fifth reflecting surface 15 is provided with an opening (i.e. the second opening 10) through which the reflected light from the first reflecting surface 11 and the straight light from the semiconductor light source 3 pass toward the second reflecting surface 12, the third reflecting surface 13, the fourth reflecting surface 14, and the fifth reflecting surface 15.

The light-blocking shield 16 blocks part L3 of the reflected light L2 from the first reflecting surface 11. The edge of the light-blocking shield 16 (i.e. the angle portion of the oblique portion 7 and the horizontal portion 8) is associated with the formation of the cutoff line of the light distribution pattern. On the other hand, the light-blocking shield reflecting surface 17 reflects the part L3 of the reflected light L2 from the first reflecting surface 11 blocked by the light-blocking shield 16 to the side of the second reflecting surface 12, the third reflecting surface 13, and the fourth reflecting surface 14.

As shown in FIG. 1 and FIG. 2, the second reflecting surface 12, the third reflecting surface 13, the fourth reflecting surface 14, and the fifth reflecting surface 15 are divided transversely. The second reflecting surface 12 and the third reflecting surface 13 are above the fourth reflecting surface 14. The fifth reflecting surface 15 is above the second reflecting surface 12, the third reflecting surface 13, and the fourth reflecting surface 14.

As shown in FIG. 1 and FIG. 2, the second reflecting surface 12, the third reflecting surface 13 are divided longitudinally. The second reflecting surface 12 is at the opposing vehicle line side (right side) relative to the third reflecting surface 13.

The second reflecting surface 12, the third reflecting surface 13, and the fourth reflecting surface 14 are reflecting surfaces that control the reflected light L2 from the first reflecting surface 11 (the reflected light L2 from the first reflecting surface 11 not blocked by the light-blocking shield 16) and the reflected light L4 from the light-blocking shield reflecting surface 17 (part L3 of the reflected light L2 from the first reflecting surface 11 blocked by the light-blocking shield 16) to be reflected on the road as a light distribution pattern for interleaving LP shown in FIG. 9. A horizontal cutoff line CL1 and an oblique cutoff line LC2 are formed at an upper edge of the light distribution pattern for interleaving LP. The horizontal cutoff line CL1 and the oblique cutoff line LC2 of the light distribution pattern for interleaving LP are formed by the edge of the light-blocking shield 16, the second reflecting surface 12, the third reflecting surface 13, and the fourth reflecting surface 14. The horizontal cutoff line CL1 of the light distribution pattern for interleaving LP is at down side by 0.57° relative to the left-right horizontal line of the screen HL-HR. In addition, the oblique cutoff line LC2 of the light distribution pattern for interleaving LP tilts toward left by 15-45° from up-down vertical line VU-VD of the screen.

Figure 4:
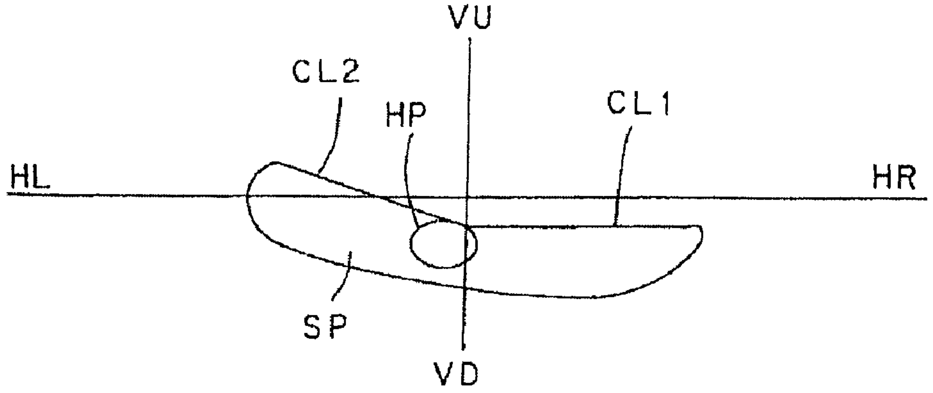
FIG. 4 is a view explaining the light distribution pattern for high light degree and the light distribution pattern for collection of the light distribution pattern for interleaving obtained by the second reflecting surface and the third reflecting surface.
Figure 5:
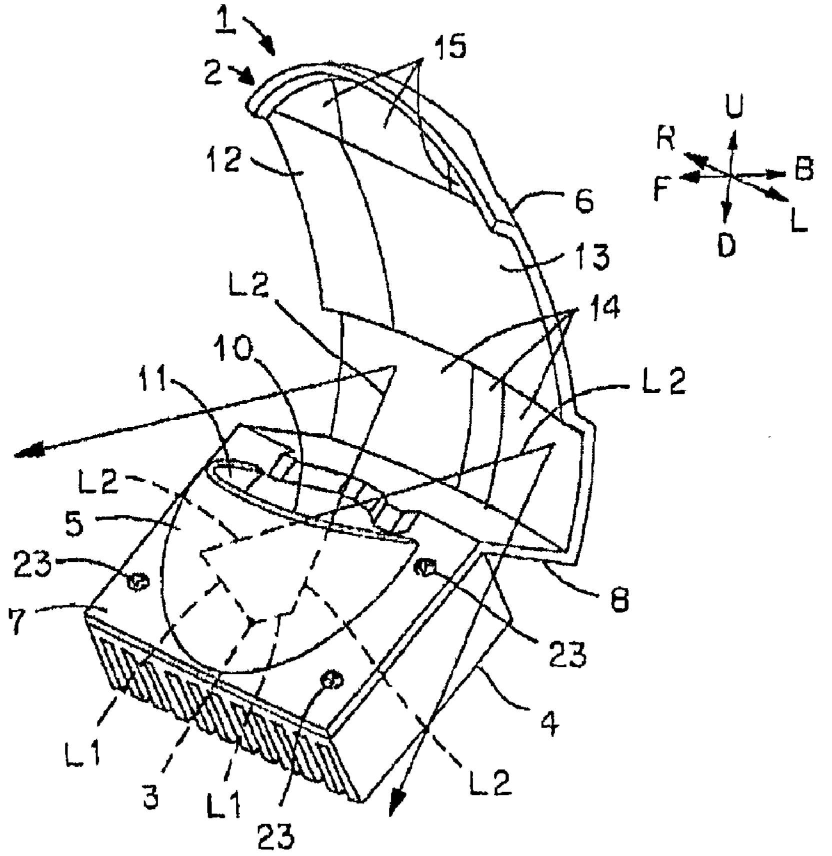
FIG. 5 is a view explaining the reflecting function of the fourth reflecting surface.

The second reflecting surface 12 is a reflecting surface that controls the reflected light L4 from the light-blocking shield reflecting surface 17 to be reflected on the road as a light distribution pattern for high light degree HP shown in FIG. 4. The light distribution pattern for high light degree HP forms a high light degree portion in the shape of facula that is narrow in scope, whereby raising the highest light degree. The light distribution pattern for high light degree HP is at the left side of the up-down vertical line VU-VD of the screen, i.e. the down side of the oblique cutoff line LC2 of the light distribution pattern for interleaving LP.

The third reflecting surface 13 is a reflecting surface that controls the reflected light L4 from the light-blocking shield reflecting surface 17 to be reflected on the road as a light distribution pattern for collection SP shown in FIG. 4. The horizontal cutoff line CL1 and the oblique cutoff line LC2 are formed at the upper edge of the light distribution pattern for collection SP. The horizontal cutoff line CL1 and the oblique cutoff line LC2 of the light distribution pattern for collection SP are formed by the edge of the light-blocking shield 16 and the third reflecting surface 13. The light distribution pattern for collection SP includes the light distribution pattern for high light degree HP. The light distribution pattern for high light degree HP and the light distribution pattern for collection SP are hot spot of the light distribution pattern for interleaving LP, meeting the main light distribution specs of the light distribution pattern for interleaving LP.

Figure 6:
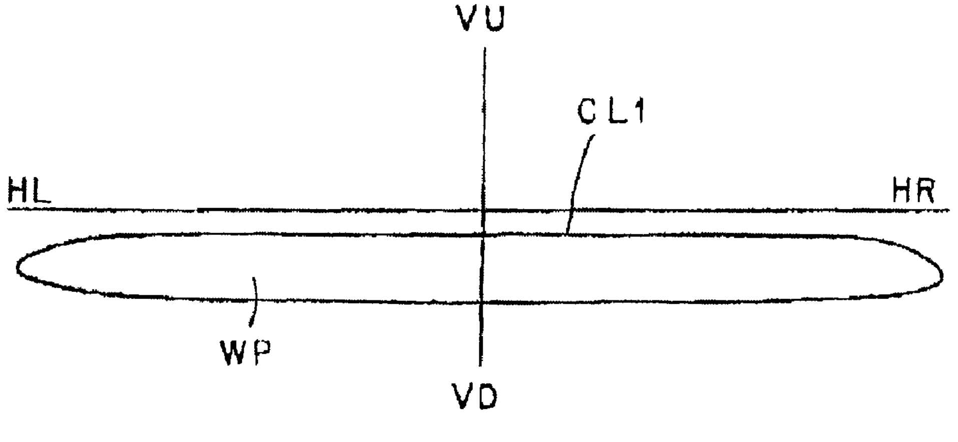
FIG. 6 is a view explaining the light distribution pattern for diffusion of the light distribution pattern for interleaving obtained by the fourth reflecting surface.
Figure 7:
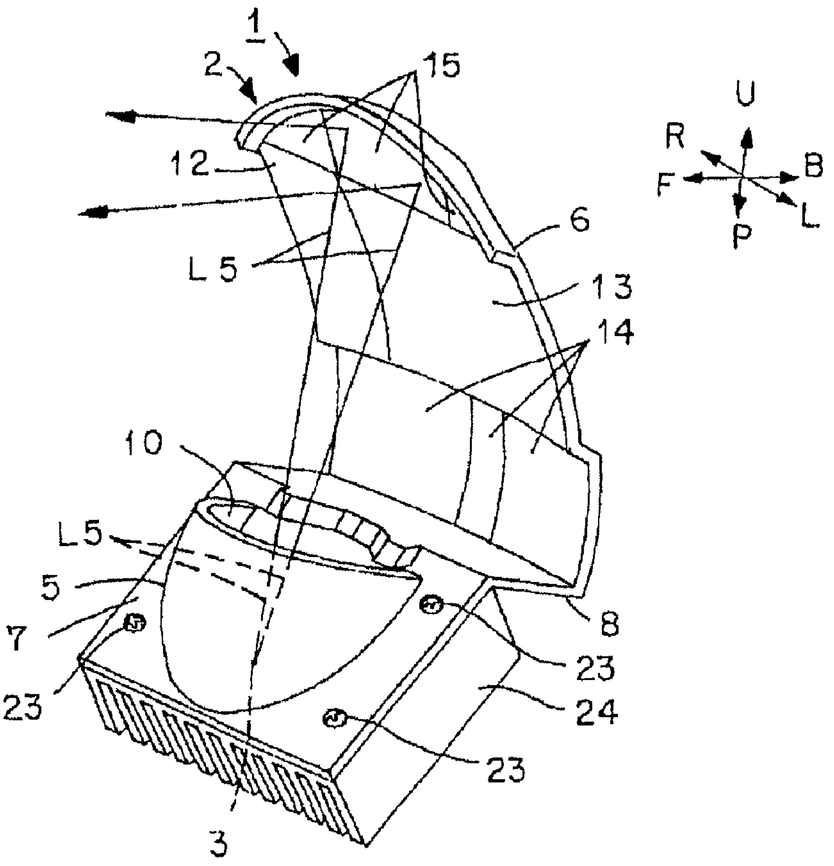
FIG. 7 is a view explaining the reflecting function of the fifth reflecting surface.

The fourth reflecting surface 14 is a reflecting surface that controls the reflected light L2 from the first reflecting surface 11 to be reflected on the road as a light distribution pattern for diffusion WP shown in FIG. 6. The horizontal cutoff line CL1 is formed at the upper edge of the light distribution pattern for diffusion WP. The horizontal cutoff line CL1 of the light distribution pattern for diffusion WP is formed by the edge of the light-blocking shield 16 and the fourth reflecting surface 14. The light distribution pattern for diffusion WP is horizontal diffusion of the light distribution pattern for interleaving LP, forming diffusion light distribution that raises the commodity of the light distribution pattern for interleaving LP. Further, the horizontal cutoff line CL1 of the light distribution pattern for diffusion WP can be set at the down side by 0.3-1° relative to the horizontal cutoff line CL1 of the light distribution pattern for collection SP.

As shown in FIG. 1, the fifth reflecting surface 15 is above the second reflecting surface 12, the third reflecting surface 13, and the fourth reflecting surface 14. The fifth reflecting surface 15 is a reflecting surface that controls the light (straight light) from the semiconductor light source 3 to be reflected as a light distribution pattern for the aerial mark OP. The light distribution pattern for the aerial mark OP is at the upper side relative to the left-right horizontal line HL-HR of the screen to illuminate on not-shown aerial mark (overhead mark).

The parabola reflecting surface is divided into four parts: the second reflecting surface 12, the third reflecting surface 13, the fourth reflecting surface 14, and the fifth reflecting surface 15. In addition, the second reflecting surface 12 and the third reflecting surface 13 are formed as a singe part. On the other hand, the fourth reflecting surface 14 and the fifth reflecting surface 15 are formed of several parts (for example three parts in the embodiment). In addition, the second reflecting surface 12, the third reflecting surface 13, the fourth reflecting surface 14, and the fifth reflecting surface 15 can be respectively formed of a single part or of several parts corresponding to the property of light distribution.

The lamp for vehicle in the embodiment has the structure mentioned above. The following is an explanation of the function of the structure.

First of all, the light source sheet 19 of the semiconductor light source 3 of the light unit 1 is turned on to emit light. Most part L1 of the light from the light source sheet 19 of the semiconductor light source 3 comes to the first reflecting surface 11. In addition, as straight light, part L5 of the light from the light source sheet 19 of the semiconductor light source 3 comes mainly to the fifth reflecting surface 15 through the second opening 10 of the reflector 2.

Light L1 coming into the first reflecting surface 11 is reflected by the first reflecting surface 11. The reflected light L2 reflected by the first reflecting surface 11 converges at the second focus F12 or its vicinity of the first reflecting surface 11. The reflected light L12 from the first reflecting surface 11, i.e. the reflected light L12 from the first reflecting surface 11 not blocked by the light-blocking shield 16, comes mainly to the fourth reflecting surface 14 through the second opening 10 of the reflector 2. In addition, the reflected light L12 from the first reflecting surface 11, i.e. part L3 of the reflected light L12 from the first reflecting surface 11 blocked by the light-blocking shield 16, is reflected by the light-blocking shield reflecting surface 17. The reflected light L4 from the light-blocking shield reflecting surface 17 comes mainly to the second reflecting surface 12 and the third reflecting surface 13 through the second opening 10 of the reflector 2.

The reflected light L4 from the light-blocking shield reflecting surface 17 coming into the second reflecting surface 12 is reflected by the second reflecting surface 12 and the third reflecting surface 13. As the light distribution pattern for high light degree HP shown in FIG. 4, the reflected light from the second reflecting surface 12 is controlled by the second reflecting surface 12 to illuminate on the road. As the light distribution pattern for collection SP shown in FIG. 4, i.e. the light distribution pattern for collection SP with the horizontal cutoff line CL1 and the oblique cutoff line LC2 at its upper edge and including the light distribution pattern for high light degree HP, the reflected light from the third reflecting surface 13 is controlled by the third reflecting surface 13 to illuminate on the road.

In addition, the reflected light L2 from the first reflecting surface 11 coming into the fourth reflecting surface 14 is reflected by the fourth reflecting surface 14. As the light distribution pattern for diffusion WP shown in FIG. 6, i.e. the light distribution pattern for diffusion WP with the horizontal cutoff line CL1 at its upper edge, the reflected light from the fourth reflecting surface 14 is controlled by the fourth reflecting surface 14 to illuminate on the road.

Overlap the light distribution pattern for high light degree HP and the light distribution pattern for collection SP shown in FIG. 4 and the light distribution pattern for diffusion WP shown in FIG. 6 to form the light distribution pattern for interleaving LP shown in FIG. 9, i.e. the light distribution pattern for interleaving LP with the horizontal cutoff line CL1 and the oblique cutoff line LC2 at its upper edge.

The straight light L5 from the light source sheet 19 of the semiconductor light source 3 coming into the fifth reflecting surface 15 is reflected by the fifth reflecting surface 15. As the light distribution pattern for aerial mark OP shown in FIG. 8, the reflected light from the fifth reflecting surface 15 is controlled by the fifth reflecting surface 15 to illuminate on the aerial mark. As a result, as shown in FIG. 9, the light distribution pattern for interleaving LP and the light distribution pattern for aerial mark OP are obtained by overlapping the light distribution pattern for high light degree HP, the light distribution pattern for collection SP, and the light distribution pattern for diffusion WP.

Here, if the light beam (light degree, illumination, lightness) of the semiconductor light source 3 is big, the light distribution pattern for interleaving LP (the light distribution pattern for high light degree HP, the light distribution pattern for collection SP, and the light distribution pattern for diffusion WP) with predetermined property of light distribution and the light distribution pattern for aerial mark OP are obtained through one light unit 1.

The above is the structure and function of the lamp for vehicle of the embodiment. The following is an explanation of the effect.

The lamp for vehicle (light unit 1) in the embodiment obtains the light distribution pattern for high light degree HP having high light degree portion through the second reflecting surface 12, the light distribution pattern for collection SP including the light distribution pattern for high light degree HP through the third reflecting surface 13, and the light distribution pattern for diffusion WP overlapping the light distribution pattern for high light degree HP and the light distribution pattern for collection SP through the fourth reflecting surface 14. As a result, the lamp for vehicle (light unit 1) in the embodiment can obtain an ideal light distribution pattern for interleaving LP using one light unit 1, and thus the traffic safety is greatly improved.

Further, in the lamp for vehicle (light unit 1) in the embodiment, because the second reflecting surface 12 is at the opposing vehicle line side (right side) relative to the third reflecting surface 13, the light distribution pattern for high light degree HP contained in the light distribution pattern for collection SP can be obtained at vehicle driving line side (left side), i.e. the left side of the up-down vertical line VU-VD of the screen, by light distribution through simple light distribution design (for example, the light distribution design in which, viewed from the plane (above) shown in FIG. 10, the light axis Z2-Z2 of the second reflecting surface 12 turns to the left side relative to the vehicle driving line side (left side), i.e. the horizontal axis (advance axis of the vehicle) H-H). In addition, in the lamp for vehicle (light unit 1) in the embodiment, because the light distribution pattern for high light degree HP contained in the light distribution pattern for collection SP is at the vehicle driving line side, the eye vision is greatly improved, and thus the traffic safety is greatly improved. Further, in the lamp for vehicle (light unit 1) in the embodiment, because the second reflecting surface 12 and the third reflecting surface 13 are above relative to the fourth reflecting surface 14, and the light distribution pattern for high light degree HP and the light distribution pattern for collection SP are above the light distribution pattern for diffusion WP, an ideal light distribution pattern for interleaving LP can be obtained using one light unit, and thus the traffic safety is greatly improved.

Further, in the lamp for vehicle (light unit 1) in the embodiment, part L3 of the reflected light L2 from the first reflecting surface 11 is blocked by the light-blocking shield 16, and thus the second reflecting surface 12 and the third reflecting surface 13 and the fourth reflecting surface 14 can easily control a light distribution pattern for interleaving LP having the cutoff line CL1 and the cutoff line LC2. In addition, in the lamp for vehicle (light unit 1) in the embodiment, because the light-blocking shield reflecting surface 17 reflects part L3 of the reflected light L2 from the first reflecting surface 11 blocked by the light-blocking shield 16 to the second reflecting surface 12 and the third reflecting surface 13, the light L1 from the semiconductor light source 3 is effectively used. Therefore, the lamp for vehicle (light unit 1) in the embodiment can obtain an ideal light distribution pattern for interleaving LP using one light unit, and thus the traffic safety is greatly improved.

Figure 8:
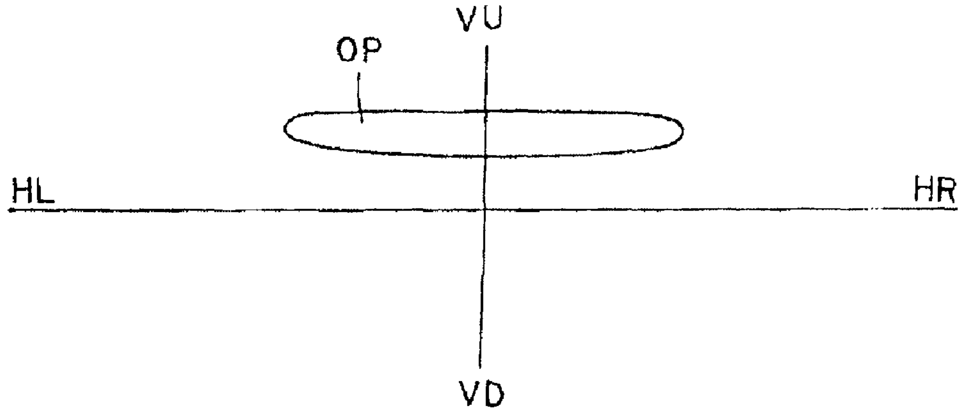
FIG. 8 is a view explaining the light distribution pattern for the aerial mark obtained by the fifth reflecting surface.

Further, in the lamp for vehicle (light unit 1) in the embodiment, because the fifth reflecting surface 15 of the parabola reflecting surface for aerial mark is above the second reflecting surface 12 and the third reflecting surface 13 and the fourth reflecting surface 14, as a light distribution pattern for aerial mark OP shown in FIG. 8, the fifth reflecting surface 15 controls the light L5 from the semiconductor light source 3. Therefore, the lamp for vehicle (light unit 1) in the embodiment can obtain an ideal light distribution pattern for interleaving LP and an ideal light distribution pattern for aerial mark OP using one light unit, and thus the traffic safety is greatly improved.

The following is an explanation of the embodiments other than the above embodiment. In the above embodiment, the second reflecting surface 12 and the third reflecting surface 13 and the fourth reflecting surface 14 of the parabola reflecting surface form the light distribution pattern for interleaving LP (the light distribution pattern for high light degree HP, the light distribution pattern for collection SP, and the light distribution pattern for diffusion WP). However, in the present invention, the predetermined light distribution pattern formed by the second reflecting surface 12 and the third reflecting surface 13 and the fourth reflecting surface 14 that are parabola reflecting surfaces can be light distribution pattern other than the light distribution pattern for interleaving LP, for example the light distribution pattern for driving, the light distribution pattern for highway, the light distribution pattern for mist lamp (mist), the light distribution pattern for rain weather, the light distribution pattern for adding lamp, etc.

In addition, in the above embodiment, the second reflecting surface 12 is at opposing vehicle line side (right side) relative to the third reflecting surface 13. However, in the present invention, the second reflecting surface 12 may not be at opposing vehicle line side (right side) relative to the third reflecting surface 13.

In addition, in the above embodiment, the second reflecting surface 12 and the third reflecting surface 13 are above the fourth reflecting surface 14. However, in the present invention, the second reflecting surface 12 and the third reflecting surface 13 may not be above the fourth reflecting surface 14.

In addition, in the above embodiment, there is a light-blocking shield 16, and the light-blocking shield 16 is provided with a light-blocking shield reflecting surface 17. However, in the present invention, there may be no light-blocking shield 16, and the light-blocking shield 16 may not be provided with a light-blocking shield reflecting surface 17.

In addition, in the above embodiment, the fifth reflecting surface 15 of the parabola reflecting surface for aerial mark is above the second reflecting surface 12 and the third reflecting surface 13 and the fourth reflecting surface 14. However, in the present invention, there can be no fifth reflecting surface 15 above the second reflecting surface 12 and the third reflecting surface 13 and the fourth reflecting surface 14 and there can be no light distribution pattern for aerial mark OP.

This application claims priority from Japanese Patent Application 2008-127098, filed May 14, 2008, which is incorporated herein by reference in its entirety.

What is claimed is:

1. A lamp for vehicle in which a semiconductor light source is used as a light source and there is a reflector including a plurality of reflecting surfaces, a first opening and a second opening, comprising:

a first reflecting surface in ellipse shape;

the semiconductor light source at a first focus or its vicinity of the first reflecting surface;

a second reflecting surface in parabola shape controlling the reflected light from the first reflecting surface to be reflected on the road as a light distribution pattern for high light degree having a high light portion;

a third reflecting surface in parabola shape controlling the reflected light from the first reflecting surface to be reflected on the road as a light distribution pattern for collection having the light distribution pattern for high light degree; and a fourth reflecting surface in parabola shape controlling the reflected light from the first reflecting surface to be reflected on the road as a light distribution pattern for diffusion overlapping the light distribution pattern for high light degree and the light distribution pattern for collection;

relative to the third reflecting surface, the second reflecting surface is at an opposing vehicle line side being opposite to a vehicle driving line side, so that the light distribution pattern for high light degree contained in the light distribution pattern for collection can be obtained at the vehicle driving line side;

the second reflecting surface and the third reflecting surface are above relative to the fourth reflecting surface, so that the light distribution pattern for high light degree and the light distribution pattern for collection are above the light distribution pattern for diffusion;

at a second focus of the first reflecting surface or its vicinity is provided with a light-blocking shield blocking part of the reflected light from the first reflecting surface;

the light-blocking shield is provided with a light-blocking shield reflecting surface reflecting part of the reflected light from the first reflecting surface blocked by the light-blocking shield to the second reflecting surface and the third reflecting surface;

the reflected light from the first reflecting surface not blocked by the light-blocking shield, comes to the fourth reflecting surface through the second opening of the reflector;

part of the reflected light from the first reflecting surface blocked by the light-blocking shield is reflected by the light-blocking shield reflecting surface, the reflected light reflected by the light-blocking shield reflecting surface comes to the second reflecting surface and the third reflecting surface through the second opening of the reflector.

2. A lamp for vehicle according to claim 1, characterized in that, above the second reflecting surface and the third reflecting surface and the fourth reflecting surface is provided with a parabola reflecting surface for an aerial mark whose focus is at the semiconductor light source or its vicinity and whose purpose is to control the light from the semiconductor light source to be reflected as a light distribution pattern for aerial mark.

* * * * *